Aug. 4, 1964  M. H. SMITH  3,142,992
SHOCK SENSITIVE DEVICES
Filed Jan. 4, 1962  5 Sheets-Sheet 4

Inventor
Melvin H. Smith
By Wm. A. Autio
Attorney

United States Patent Office 3,142,992
Patented Aug. 4, 1964

3,142,992
SHOCK SENSITIVE DEVICES
Melvin H. Smith, Menomonee Falls, Wis., assignor to Cutler-Hammer, Inc., Milwaukee, Wis., a corporation of Delaware
Filed Jan. 4, 1962, Ser. No. 164,364
19 Claims. (Cl. 74—2)

This invention relates to shock sensitive devices. More particularly, the invention relates to mechanical devices which are settable to store potential energy therein and which respond to shock such as explosion, impact, sudden acceleration or the like to release the potential energy whereby to cause forced movement of an actuator.

While not limited thereto, the invention is especially applicable to control or operation of electrical switches or the like of the type which require a relatively large force for actuation thereof and which must be held in their actuated condition following termination of the shock until resetting thereof is desired.

An object of the invention is to provide improved shock sensitive devices.

A more specific object of the invention is to provide improved shock sensitive devices which will respond to shock from any direction.

Another specific object of the invention is to provide improved means responsive to a shock of predetermined value to cause movement of an actuator and which will not reset automatically upon termination of such shock but will be held in its actuated condition.

Another specific object of the invention is to provide improved shock responsive means for operating a device of the type requiring a relatively large force for actuation thereof and for maintaining such device in its actuated condition until the shock responsive means is reset.

Another specific object of the invention is to provide shock sensitive devices with improved means rendering the same settable to store potential energy whereby a shock will cause tripping thereof and release of such potential energy to cause movement of actuating means.

Another specific object of the invention is to provide a shock responsive device with improved inertia-operated means for causing tripping thereof regardless of the direction of the shock.

Another specific object of the invention is to provide a shock sensitive device of the type having inertia means with improved means rendering such device responsive to substantially the same value of shock from any direction.

A further specific object of the invention is to provide a shock responsive device with improved tripping means operable to release a relatively large amount of stored potential energy whereby to cause movement of an actuator.

A related object of the invention is to provide a shock responsive device which is simple and economical in construction and efficient in operation.

Other objects and advantages of the invention will hereinafter appear.

According to the invention, there is provided a shock sensitive device having a mounting panel adapted to be secured rigidly to a support subject to shock. The device is provided with an inertia member of predetermined mass. The inertia member is provided with opposed cam surfaces cooperating with complementary cam members in horizontal alignment whereby relative motion therebetween in any direction causes the cam members to be spread apart. The cam members are rigidly secured intermediate the ends of respective levers pivoted to the mounting panel at their lower ends and resiliently biased toward one another. The upper ends of the levers are provided with catches engaging a latch connected to a spring-biased actuator whereby the actuator is driven when the catches release the latch. The inertia member is resiliently supported to equalize the opposite vertical shock forces required for tripping and resilient bias means are provided on opposite sides of the inertia member adjacent the cam members to tend to equalize the forces required in the direction of the cam members with the horizontal forces transverse thereto required for tripping. The catches are provided with flat faces engaging flat faces parallel therewith at the tips of the latch whereby a relatively large amount of potential energy may be stored in the spring-biased actuator. In a modification of the invention, only one lever is provided with a catch and the latch is lengthened and journaled intermediate its ends to the unsecured end of the other lever. Potential energy is stored by biasing the lengthened end of the latch in the direction of the adjacent latch-pivoting lever. And the actuator is journaled to the latch at a point between the catch-engaging end of the latter and the joint where the latch is journaled to the lever whereby upon being released from the catch the latch pivots on the lever and drives the actuator under the force of the aforementioned potential energy.

The aforementioned and other objects and advantages of the invention and the manner of obtaining them will best be understood by reference to the following detailed description of embodiments of shock sensitive devices taken in conjunction with the accompanying drawings wherein.

Referring to FIGS. 1 through 4, the shock sensitive device shown therein comprises an upstanding generally rectangular mounting panel or plate 2 of steel or the like having a portion of its upper end bent at an angle of ninety degrees to form a forward extending flange 2a. The vertical portion of the mounting plate is provided with a plurality of spaced holes 2b adapted for securing the same rigidly to suitable supporting structure subject to shock. Flange 2a is provided with a suitably located aperture 2c freely accommodating and guiding an actuator hereinafter described. A large, generally rectangular aperture 2d is provided centrally of the lower half of plate 2 to afford clearance for the rear, curved portion of a cylindrical interia member hereinafter described.

Figure 2:
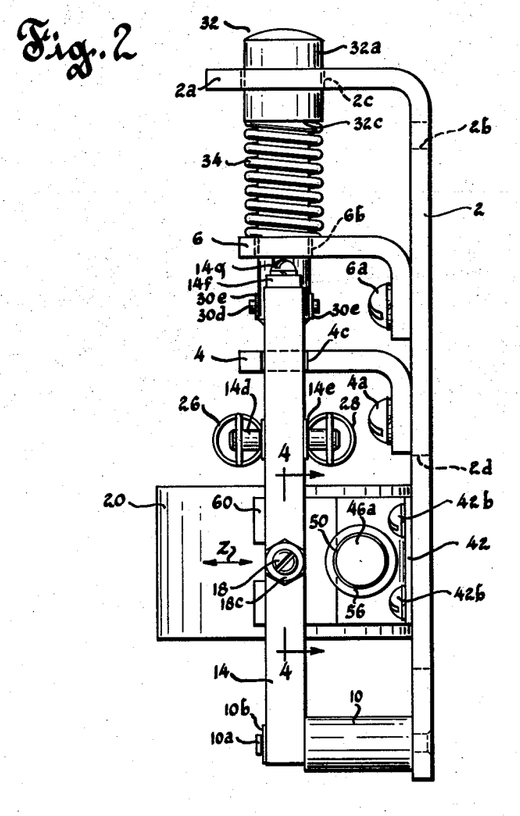
FIG. 2 is a right-side elevation view of the device of FIG. 1.
Figure 3:
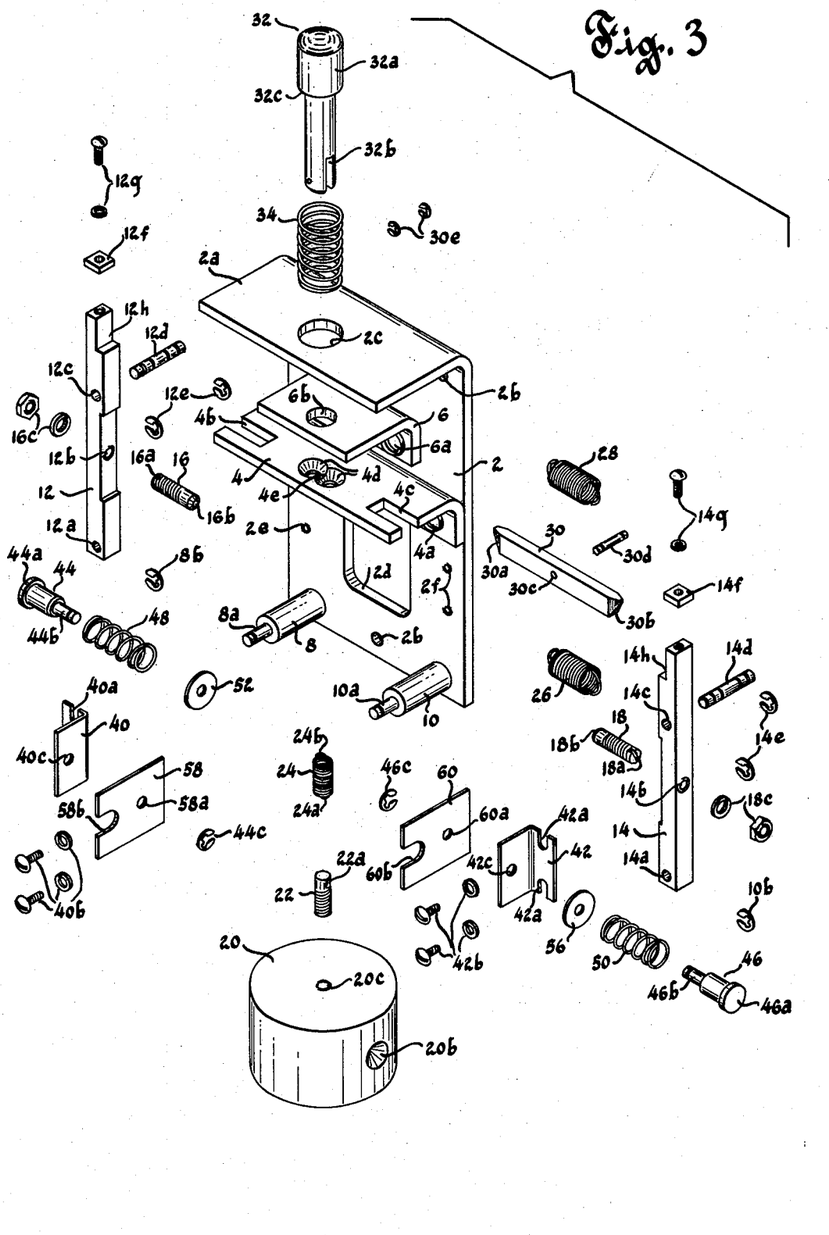
FIG. 3 is an exploded isometric view showing the constituent parts of the device of FIG. 1.

A horizontal L-shaped bracket 4 extends across substantially the mid-portion of plate 2 and is rigidly secured at its "foot" portion to the front face of plate 2 by a pair of screws 4a or the like. Thus, the "shank" portion of the bracket extends forwardly from the front face of the mounting plate to serve as a supporting and guiding means for parts hereinafter described. The forwardly extending portion of bracket 4 is provided with a pair of aligned slots 4b and 4c extending toward one another from the opposite sides theerof as shown in FIGS. 2 and 3 to serve as guiding means for levers hereinafter described. The forwardly extending portion of bracket 4 is provided at its mid-portion intermediate the sides thereof with a pair of holes 4d laterally spaced close to one another and reamed at their upper ends to provide a rib 4e therebetween for connection to resilient supporting means hereinafter described.

A bracket 6 similar to bracket 4 but narrower is similarly secured by screws 6a or the like to the front face of plate 2 and centrally between the sides thereof and between bracket 4 and flange 2a. The forwardly extending portion of bracket 6 is provided centrally intermediate the sides thereof with an aperture 6b for freely accommodating and guiding the actuator hereinafter described.

A pair of spaced-apart forwardly extending studs 8 and 10 are rigidly secured at first ends thereof adjacent the lower corners of mounting plate 2. These studs may be secured by any suitable means such as by inserting reduced end portions thereof through close-fitting holes in the mounting plate which have been reamed at the rear ends, riveting the same and grinding the riveted ends flush with the rear surface of the mounting plate so that they do not interfere with mounting the latter on a flat surface. Studs 8 and 10 are provided with reduced, round forward end portions 8a and 10a most clearly shown in FIG. 3 which are journaled in holes 12a and 14a extending forwardly through the lower ends of the levers 12 and 14, respectively. The thicker intermediate portions of studs 8 and 10 serve to space the respective levers from the mounting plate as shown in FIG. 2. The reduced forward end portions 8a and 10a are provided with suitable retaining means such as resilient C-lips 8b and 10b snapped into annular grooves on such reduced end portions to prevent the levers from sliding off the studs but to permit pivoting of the levers thereon.

Levers 12 and 14 are provided with threaded holes 12b and 14b therethrough for receiving cam members 16 and 18, respectively. These threaded holes are in alignment with one another and extend through the levers at equally spaced points from the lower pivoted ends of the latter in a horizontal direction perpendicular to the direction of holes 12a and 14a. Cam members 16 and 18 are in the form of threaded studs or rods and are provided with screwdriver-receiving slots 16a and 18a at their outer ends to facilitate turning the same in the holes in the levers and adjustment thereof toward one another. The inner ends of cam members 16 and 18, that is, the ends thereof extending toward one another are beveled to provide frusto-conical end portions 16b and 18b, most clearly shown in FIG. 4, having forty-five degree angles with respect to the center axes thereof for interfitting cooperation with cam surfaces 20a and 20b, respectively, formed on opposite sides of inertia member 20. Split-ring locking washers and locking nuts 16c and 18c on the outer ends of cam members 16 and 18 are turned tight against the associated levers to rigidly secure the cam members in adjusted positions.

Figure 10:
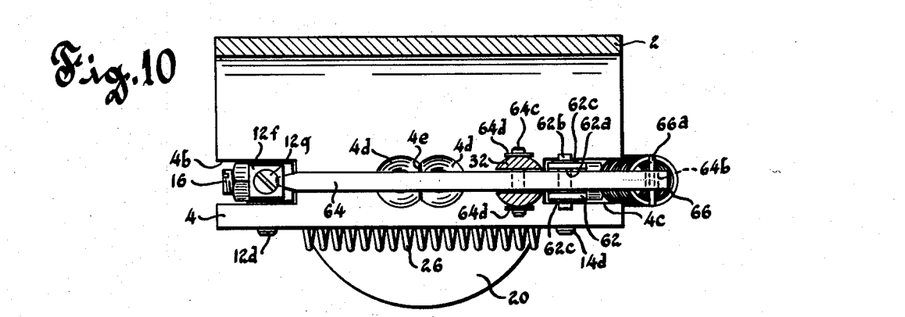
FIG. 10 is a cross-sectional view taken along line 10—10 of FIG. 9.
Figure 11:
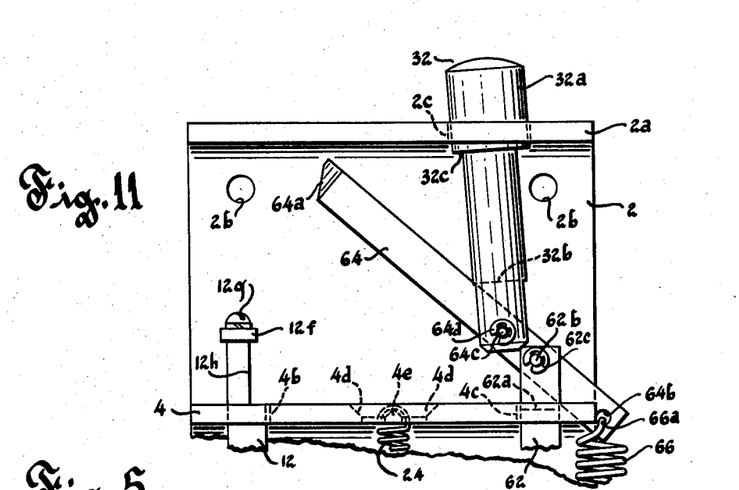
FIG. 11 is a fragmentary front elevation view of the upper portion of the device of FIG. 8 showing the device in its tripped condition.

Inertia member 20 is a generally flat, cylindrical, solid piece of metal having predetermined mass and having flat upper and lower surfaces and being circular at its horizontal girth as shown in FIGS. 3 and 10. Cam surfaces 20a and 20b are conical depressions on opposite sides of the inertia member in the rounded portions thereof and extend toward one another. These conical depressions are also provided with forty-five degree angle surfaces relative to the center axes of cam members 16 and 18 for interfitting, complementary engagement with the frusto-conical end portions of the cam members. A threaded hole 20c shown in FIG. 3 extends partway downwardly from the upper surface of inertia member 20 on the center axis thereof for receiving a threaded spring-securing pin 22 of the eye-bolt type. As most clearly shown in FIG. 3, pin 22 is provided at its upper end with a transverse, reamed hole 22a for receiving a lower end hook 24a of a helical tension spring 24. The upper end hook 24b of spring 24 extends up through one hole 4d and down through the other hole 4d in bracket 4 whereby the rib 4e between these holes supports the spring to provide resilient supporting means for inertia member 20.

Figure 1:
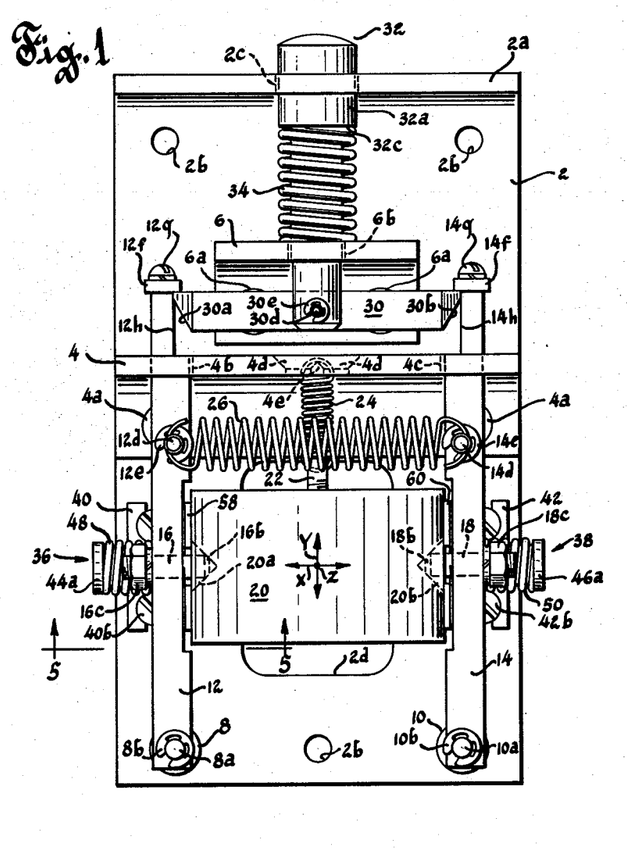
FIGURE 1 is a front elevation view of a shock sensitive device constructed in accordance with the invention.

The upper end portions of levers 12 and 14 extend through and beyond slots 4b and 4c, respectively, in bracket 4 and are free to slide outwardly in these slots except for biasing means hereinafter described. This biasing means preferably comprises a pair of helical tension springs 26 and 28 extending horizontally between levers 12 and 14 at a point between inertia member 20 and bracket 4. To secure these springs to the levers, the latter have holes 12c and 14c extending forwardly therethrough. Retaining pins 12d and 14d are mounted in the respective holes and extend beyond the front and rear surfaces of the levers. Pairs of C-clips 12e and 14e are snapped in annular grooves in the pins immediately adjacent the front and rear surfaces of the levers to restrict the pins from sliding in their holes. The front ends of pins 12d and 14d are provided with annular grooves for retaining the opposite end hooks of spring 26. Similarly, the rear ends of these pins are provided with annular grooves for retaining the opposite end hooks of spring 28 as shown in FIGS. 1 and 2.

The upper ends of levers 12 and 14 are provided with catches 12f and 14f. While these catches may take various forms, they are preferably square, flat, centrally apertured pieces of steel secured by split-ring locking washers and screws 12g and 14g to the upper end surfaces of the levers, respectively. Alternatively, cutout portions 12h and 14h may be provided on the inwardly facing edges of the levers if catches 12f and 14f are formed integrally with the respective levers.

Figure 6:
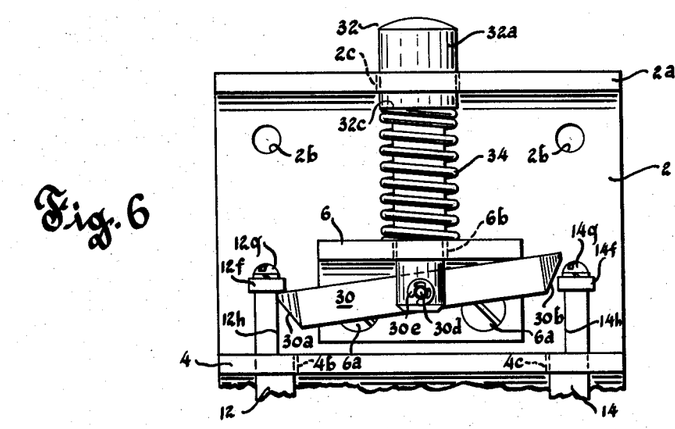
FIG. 6 is a fragmentary front elevation view of the upper portion of the device of FIG. 1 showing the device in its tripping condition.

A latch 30 comprising a steel bar extends between the upper ends of the levers and engages catches 12f and 14f at its ends. The forward, rear and lower sides of the ends 30a and 30b of latch 30 are beveled as shown in FIGS. 1 and 3 to decrease the frictional surface areas of engagement between the opposite ends of the latch and the respective catches, to provide clearance between the first-released end of the latch and the associated catch as shown in FIG. 6 and to facilitate resetting of the device. The center of latch 30 is provided with a forwardly-extending hole 30c therethrough for accommodating a pin 30d for pivoting thereto an actuator 32.

Actuator 32 is a plunger-type rode having an enlarged upper portion 32a slidably accommodated and guided in complementary aperture 2c in flange 2a. The intermediate and lower portions of actuator 32 are of reduced diameter relative to the upper portion and the lower end portion extends through guiding aperture 6b in bracket 6 and is bifurcated below bracket 6 to provide two leg portions having a slot 32b therebetween for accommodating the central portion of latch 30. The aforementioned pin 30d extends also through aligned holes in these leg portions and has C-clips 30e snapped into annular grooves at the end portions thereof to retain the pin in its holes. As will be apparent, pin 30d pivotally secures latch 30 to actuator 32.

A potential energy storing device comprising a helical compression spring 34 surrounds the intermediate reduced portion of actuator 32. Spring 34 is compressed between the upper surface of bracket 6 and annular shoulder 32c at the lower end of enlarged portion 32a of actuator 32.

Compensating means are provided to prevent the device from being tripped by smaller force in the X direction than is required for tripping when the force is in either the Y or Z direction, the X, Y and Z directions being indicated by arrows in FIG. 1. It will be apparent that a shock in either the Y or Z directions will pivot both levers 12 and 14 away from one another to trip the device whereas a shock in the X directions will pivot only one of the levers to trip the device. Since less force is required to move one of the levers than is required to move both of the levers, a smaller shock in the X direction would cause tripping. To tend to equalize the force required in the X direction with that required in the other directions, a pair of resiliently-biased plate assemblies 36 and 38 shown in FIG. 1 are provided, one on each side of inertia member 20 and spaced from one another horizontally in the X direction by a distance equal to the diameter of inertia member 20.

As shown in FIGS. 1, 2 and 3, spring-biased plate assemblies 36 and 38 are provided with horizontal generally L-shaped mounting brackets 40 and 42, respectively. The "foot" portions of these brackets extend away from one another and are provided with respective pairs of slots 40a and 42a, the slots of each such pair being on the upper and lower edges of the associated bracket. Corresponding pairs of screws 40b and 42b having split-ring locking washers thereon extend through these pairs of slots and are turned into respective pairs of threaded holes 2e and 2f in mounting plate 2 to secure the brackets rigidly to the mounting plate so that the "shank" portions of the brackets extend forwardly from the front face of the mounting plate. Pairs of slots 40a and 42a afford adjustment of the brackets up or down on their retaining screws horizontally to align the brackets. Brackets 40 and 42 are further provided with horizontally aligned holes 40c and 42c through the forwardly extending portions thereof for receiving spring-biased retaining pins 44 and 46.

As shown in FIG. 3, pins 44 and 46 are provided with enlarged heads 44a and 46a, intermediate cylindrical portions and reduced end portions 44b and 46b, respectively. Helical compression springs 48 and 50 surround the intermediate portions of the respective pins between the enlarged heads 44a and 46a thereof and respective washers 52 and 56 inserted on the reduced end portions 44b and 46b of the pins. The reduced end portions of these pins also extend through holes 40c and 42c in the forwardly extending portions of brackets 40 and 42, respectively. The reduced end portions of these pins further extend through holes 58a and 60a in plates 58 and 60, respectively. The extreme ends of the reduced portions 44b and 46b of the pins are provided with annular grooves having C-clips 44c and 46c snapped therein against the inner flat surfaces of plates 58 and 60. As a result, springs 48 and 50 are compressed between the enlarged heads of the pins and the associated washers on the outer surfaces of the forwardly extending portions of brackets 40 and 42 to resiliently bias plates 58 and 60 flat against the inner surfaces thereof. The selection of the thickness of washers 52 and 56 determines the value of the bias force applied by springs 48 and 50 and this bias force may be adjusted by substituting washers of different thicknesses.

Figure 5:
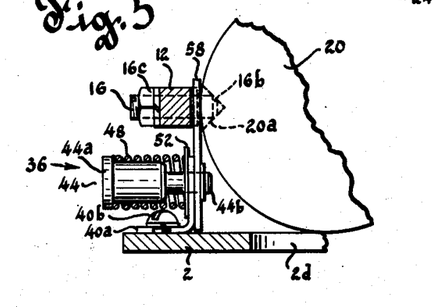
FIG. 5 is a fragmentary cross-sectional view taken along line 5—5 of FIG. 1.
Figure 8:
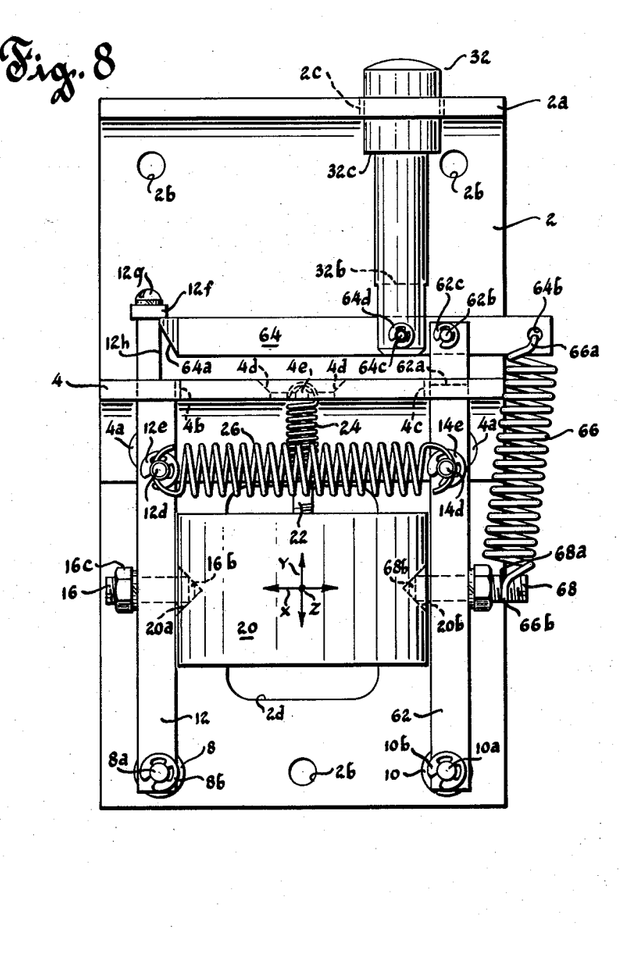
FIG. 8 is a front elevation view of a modification of the invention.
Figure 9:
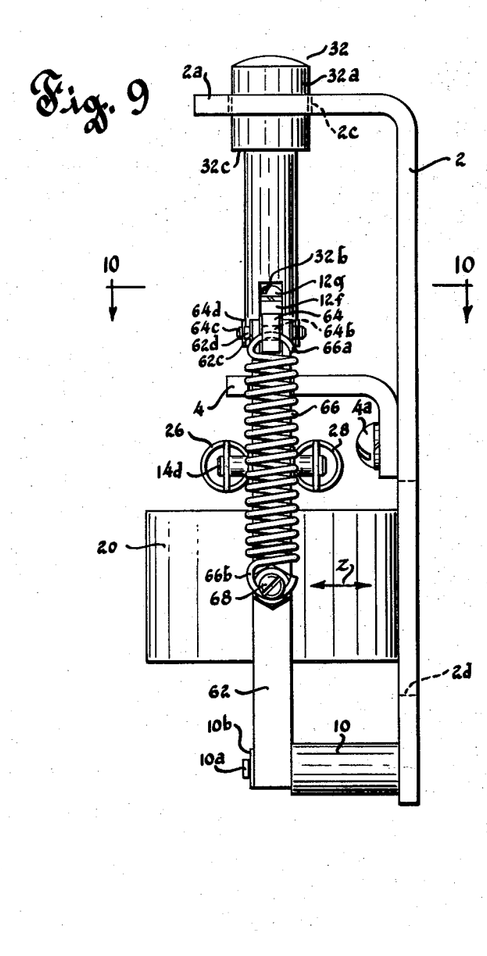
FIG. 9 is a right-side elevation view of the device of FIG. 8.

Plates 58 and 60 are rectangular in shape and extend forwardly beyond the forwardly extending portions of brackets 40 and 42. The forward ends of plates 58 and 60 are bifurcated to provide slots 58b and 60b therein. As shown in FIGS. 1, 2 and 5, plates 58 and 60 extend between the opposite sides of inertia member 20 and levers 12 and 14, respectively. The bifurcated portions of these plates extend above and below cam members 16 and 18 whereby the latter are accommodated in slots 58b and 60b. Brackets 40 and 42 are adjusted by bending the same so that the bifurcated portions of plates 58 and 60 are contiguous to but do not touch the opposite rounded sides of inertia member 20 so that the compensating devices 36 and 38 have no effect when shock forces are applied in the Y and Z directions. While levers 12 and 14 are shown in FIG. 1 as having cutout portions on their inner edges to provide space for plates 58 and 60 on the opposite sides of inertia member 20, it will be apparent that such inner edges of the levers could be straight if the lower pivot pins 8 and 10 are mounted on mounting plate 2 a slightly longer distance apart. However, if compensating plate assemblies 36 and 38 are omitted, the inner edges of the levers may also be straight as shown in FIG. 8 and the levers may be pivoted at the lower ends the distance apart shown in FIG. 1.

Figure 7:
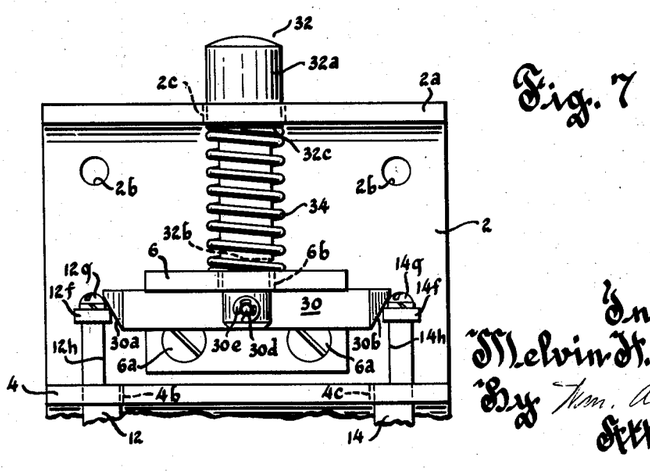
FIG. 7 is a view like FIG. 6 showing the device in its tripped condition.

Tension spring 24 supports the weight of inertia member 20 on bracket 4 so that the forces required in opposite directions on the vertical Y axis to strip the device are more nearly equalized. When a shock is applied to mounting plate 2 on the Y axis, the device will move up or down depending on the direction of applied force whereas inertia member 20 will tend to remain stationary. As a result, cam members 16 and 18 will slide on the conical cam surfaces in the inertia member to move lever 12 counterclockwise and to move lever 14 clockwise whereby the upper ends of the levers spread apart. If one lever, for example lever 14, moves faster than the other lever, catch 14f will release the right-hand end of latch 30 as shown in FIG. 6. As a result, spring 34 pushes actuator 32 upwardly. Aperture 2c is slightly larger than upper end 32a of actuator 32 and aperture 6b is sufficiently larger than the lower, reduced end of actuator 32 so that the lower end of actuator 32 can move sideways under the force of spring 34 to release the left-hand end of latch 30 from catch 12f. It will be apparent that after the right-hand end of catch 30 is released, it snaps against the right-hand side of bracket 6. Since latch 30 is now slanted, the remaining force in spring 34 will cause the lower end of actuator 32 to shift in the right-hand direction. The lower end of actuator 32 carries latch 30 with it to cause the left-hand of the latter to slip off catch 12f. Also, catch 12f may now shift in the left-hand direction in FIG. 6 along with levers 12 and 14 to assist in separating catch 12f from the left-hand end of latch 30. As a result, spring 34 drives actuator 32 until latch 30 settles flat against the lower surface of bracket 6 as shown in FIG. 7. The upper end of actuator 32 may be rounded in the shape of a partial sphere for engagement with the controlled device that is actuated thereby. Although both catches 12f and 14f ultimately release catch 30, the device is constructed so that actuator 32 moves sufficiently to operate the controlled device when only one end of latch 30 is released from its associated catch.

Figure 4:
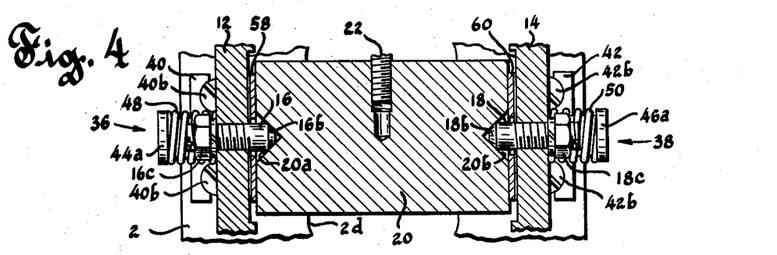
FIG. 4 is a fragmentary cross-sectional view taken along line 4—4 of FIG. 2.

When a shock force is applied on the Z axis shown in FIG. 1, the device will operate in the manner hereinbefore described to trip the device. The reason for this is that cam surfaces 20a and 20b in the inertia member are conical as shown in FIGS. 1, 3 and 4 whereby a shock force on either the Y or Z axis will cause movement of both levers in directions away from one another.

When a shock force is applied on the X axis, only one of the levers will move outwardly. The lever which moves depends on the direction, left or right, of the shock force in FIG. 1. Assuming that the shock force is applied to mounting plate 2 in the right-hand direction, inertia member 20 will tend to remain stationary whereby lever 12 will pivot clockwise. Since it takes less force, such as one-half the force, to pivot one lever a given amount against the force of springs 26 and 28 than it does to pivot both levers in opposite directions such amounts, compensating devices 36 and 38 have been provided to increase the force required to pivot one lever. In the aforementioned example, movement of bracket 40 in the right-hand direction in FIG. 1 with the mounting plate will cause plate 58 to pivot. Referring to FIG. 5, plate 58 will pivot counterclockwise on the end of bracket 40. In order for plate 58 to pivot, it must pull pin 44 in the right-hand direction and slide the reduced portion thereof in the hole in bracket 40 and must compress spring 48. The force required to compress spring 48 is added to the force required to stretch springs 26 and 28 the aforementioned given amount. If these forces are equal and the force required to pivot one lever is one-half of the force required to pivot both levers in opposite directions, the compensating means tends to equalize the forces required in the X axis directions with the forces required in directions perpendicular thereto to trip the device.

To reset the device, actuator 32 is pressed downwardly. Beveled end surfaces 30a and 30b cam against catches 12f and 14f to spread the levers apart against the combined forces of springs 26 and 28 until the ends of latch 30 snap below the catches.

In the modification shown in FIGS. 8, 9, 10 and 11, reference characters like those in FIGS. 1 through 7 have been shown for like parts. This modification differs from the device shown in FIGS. 1 through 7 primarily in the latch and provides a simpler structure whereby the frictional forces are significantly decreased and the actuating force is amplified.

In FIG. 8, a lever 62 which is slightly shorter than lever 12 is provided at its upper end with bifurcated portions providing a slot 62a shown in FIG. 10 therebetween for freely accommodating a latch member 64. A pivot pin 62b extends rhotugh aligned holes in the bifurcated end portions of lever 62 and in latch member 64 at a point spaced from the right-hand end of the latter for pivoting the latch member onto the end of the lever. C-clips 62c are snapped in annular grooves on each end of pin 62b to retain the pin its its place.

The left-hand end of latch member 64 is like the left-hand end of latch 30 in FIG. 1 and is provided with beveled portions 64a for like reasons. The right-hand end of latch member 64 extends beyond lever 62 to afford leverage whereby potential energy is stored and drives actuator 32 when such energy is released. For this purpose, this right-hand end of latch member 64 is provided with a hole 64b for receiving and retaining the upper end hook 66a of a helical tension spring 66. In this modification, cam member 68 is longer at its right-hand threaded end than cam member 18 in FIG. 1 and is provided with an annular groove 68a for retaining lower end hook 66b of tension spring 66 fixed. It will be apparent that tension spring 66 is used in FIG. 8 to store potential energy rather than a compression spring such as 34 in FIG. 1. Except for being longer and having the aforementioned annular groove, cam member 68 is otherwise like cam member 18 in FIG. 1.

The lower end of actuator 32 is pivotally connected to latch member 64 at a point spaced in the left-hand direction from lever 62 by a pivot pin 64c which is held in the aligned holes in latch member 64 and the bifurcated portions at the lower end of actuator 32 by C-clips 64d snapped into annular grooves at the opposite ends of pivot pin 64c. It will be apparent that the aforementioned structure locates actuator 32 near the right-hand side of the device as shown in FIG. 8 rather than at the center as in FIG. 1. For this reason, aperture 2c in flange 2a is also near the right-hand side of the flange to serve as a guide for the upper end of the actuator. In this modification, a bracket like bracket 6 of FIG. 1 is not required because actuator 32 is connected to latch member 64 and the latter is connected to lever 62. The distance between pivot pins 62b and 64c is shorter than the distance between hole 64b and pivot pin 62b to provide amplification whereby a large amount of potential energy is released when the device trips.

When the device of FIGS. 8–11 is subjected to a shock in the Y or Z directions, cam members 16 and 68 move relative to inertia member 20 to cause levers 12 and 62 to spread apart at their upper ends. The movements of both levers are added to cause the left-hand end of latch member 64 to slip off catch 12f because there is no significant movement between latch member 64 and lever 62 and pivot pin 62b. As a result, spring 66 pivots latch member 64 clockwise on pin 62b to the position shown in FIG. 11. This clockwise pivotal movement of latch member 64 causes actuator 32 to be driven upwardly to operate a driven device. The use of only a single catch 12f for engagement with latch member 64 reduces the frictional surface area forces over that present in the device of FIGS. 1 through 7.

When the modified device is subjected to shock in the X directions, one of the levers will move away from the other to release latch member 64 from catch 12f to trip the device as aforementioned. While not shown in FIG. 8, compensating devices like 36 and 38 in FIG. 1 may be used in this modification.

To reset the device, latch member 64 is depressed and thereby pivoted counterclockwise until the left-hand end thereof hooks on catch 12f. The beveled end 64a facilitates spreading of levers 12 and 62 to permit the latch member to enter below catch 12f.

Since friction losses in mechanical devices may change with use, the structures hereinbefore described have been devised to minimize the role of friction in operation of the device. To this end, springs 26 and 28 have been used to bias the levers toward one another and friction between relatively movable parts has been reduced to a minimum. For example, the front and rear sides of both ends of latch 30 in FIG. 1 and the left-hand end of latch member 64 in FIG. 8 have been beveled to reduce the frictional area between the latches and the catches 12f and 14f. The characteristics of spring such as springs 26 and 28 tend to remain constant throughout the life of the device. By varying the strength of spring 34 in FIG. 1 or spring 66 in FIG. 8, the amount of force acting on actuator 32 can be varied. It will be apparent, that weaker or stronger springs can readily be substituted for springs 34 and 66. Also, by properly selecting the lengths of the lever arms between pin 62b and spring 66 and between pins 62b and 64c, the amount of force acting on actuator 32 can be predetermined. To attain reliable and consistent operation, the parts of the device except for conventional hardware, are preferably made of stainless steel. In addition certain parts may be hardened and polish chrome plated.

By varying the mass of inertia member 20, the tension in springs 26 and 28 and the distances between the lower pivots of the levers and the cam members relative to the distances between such lower pivots and the catches, the G level (gravity level) and the frequency of the shock wave at which the device will trip can be adjusted.

While the invention hereinbefore described is effectively adapted to fulfill the objects stated, it is to be understood that I do not intend to confine my invention to the particular preferred embodiment of shock sensitive devices disclosed, inasmuch as they are susceptible of various modifications without departing from the scope of the appended claims.

I claim:

1. In a shock sensitive device operable to release a relatively large amount of mechanical energy when subjected to a shock force from any direction;
   (a) actuator means movable to actuate an external device,
   (b) potential energy storing means biasing said actuator means for movement in a direction to actuate the external device,
   (c) and means responsive to a shock from any direction for releasing said actuator means whereby the potential energy of said biasing means is released to drive said actuator means in said direction, said shock responsive means comprising an inertia member and means for supporting said inertia member for relative movement with respect to said supporting means sufficient to release said actuator means in response to a shock from any direction and means automatically operating when the shock terminates to restore said inertia member and its said supporting means to their original relative positions.

2. The invention defined in claim 1, wherein said means for releasing said actuator means comprises resiliently biased latch means responsive to depression of said released actuator means in the opposite direction against the force of said actuator biasing means for re-engaging said actuator means to reset the latter for another operation.

3. In a shock sensitive device operable to release a relatively large amount of mechanical energy when subjected to a shock force from any direction;
(a) actuator means movable to actuate an external device,
(b) potential energy storing means biasing said actuator means for movement in a direction to actuate the external device,
(c) and means responsive to a shock from any direction for releasing said actuator means whereby the potential energy of said biasing means is released to drive said actuator means in said direction comprising:
(d) mounting means subject to shock,
(e) lever means pivoted on said mounting means,
(f) an inertia member,
(g) cam means mounting said inertia member on said lever means to afford relative movement therebetween when said mounting means is subjected to shock,
(h) and latch means restraining said actuator means against the force of said potential energy storing and biasing means normally to prevent movement of said actuator means, and said latch means being responsive to said relative movement between said inertia member and said lever means to release said actuator means whereby said biasing means drives said actuator means in said direction.

4. The invention defined in claim 3, wherein said latch means comprises means responsive to depression of said released actuator means against the force of said biasing means for relatching said latch means.

5. The invention defined in claim 3, wherein said shock responsive means further comprises a resilient device suspending said inertia member from said mounting means to support the weight of said inertia member whereby impact forces in opposite vertical directions required to release said actuator means are equalized.

6. The invention defined in claim 3, wherein said shock responsive means further comprises resilient means biasing said lever means against said inertia member whereby to maintain the same in engagement at said cam means but to allow relative movement therebetween against the force of said resilient means in response to a shock force.

7. In a shock responsive device operable to release a relatively large amount of stored potential energy when subjected to a shock force from any direction to trip the same;
(a) a plunger axially movable to actuate an external device,
(b) means comprising a potential energy storing spring biasing said plunger for movement in a axial direction,
(c) a latch member connected to one end of said plunger for restraining said plunger from movement by said spring,
(d) and means responsive to a shock force from any direction for releasing said latch member to allow said spring to move said plunger whereby to actuate the external device, said shock responsive means comprising:
(e) a mounting member,
(f) means supporting said plunger on said mounting member for axial sliding movement,
(g) an inertia member comprising cam surfaces on opposite sides thereof,
(h) a pair of levers pivoted on said mounting member at first ends thereof and extending on opposite sides of said inertia member,
(i) cam members on said levers cooperating with said cam surfaces on said inertia member,
(j) catch means engaging said latch member to restrain said plunger from movement,
(k) and said cam members comprising surfaces complementary to said cam surfaces on said inertia member whereby subjection of said mounting member to a shock force causes relative movement between said inertia member and at least one of said levers to cause relative movement between said other ends of said levers whereby to cause said catch means to release said latch member to trip the device.

8. The invention defined in claim 7, wherein said shock responsive means further comprises compensating means for equalizing the shock force required in a direction in line with said cam surfaces with the shock force in other directions required to release said latch member.

9. The invention defined in claim 7, wherein said latch member comprises an elongated bar pivotally connected at a point between its ends to one end of said plunger and cooperating with said catch means to restrain said plunger from movement.

10. The invention defined in claim 7, wherein said means comprising a potential energy storing spring biasing said plunger also comprises:
(a) a shoulder on said plunger,
(b) a bracket on said mounting member,
(c) and said spring being helical and surrounding said plunger and being compressed between said shoulder and said bracket when said latch member is in engagement with said catch means.

11. The invention defined in claim 7, wherein said catch means comprises shoulder on said other ends of said levers projecting toward one another and engaging opposite ends of said latch member to restrain said plunger from movement by said spring.

12. The invention defined in claim 11, wherein said levers are resiliently biased toward one another and said latch member comprises beveled ends for camming against said shoulders when said plunger is depressed thereby to spread said other ends of said levers to allow said latch member to reengage said shoulders on said levers.

13. The invention defined in claim 7, wherein said shock responsive means further comprises tension spring means connected to said levers for resiliently biasing the same toward one another to maintain said cam members in engagement with said cam surfaces on opposite sides of said inertia member.

14. The invention defined in claim 7, wherein said means comprising a potential energy storing spring biasing said plunger also comprises:
(a) a pivotal connection between said other end of one of said levers and said latch member, said pivotal connection being at a point between one end of said latch member and said plunger connection thereto,
(b) and means connecting said spring in tension between said one end of said latch member and an intermediate point on said one lever.

15. The invention defined in claim 14, wherein said catch means comprises a shoulder on said other end of the other lever for engagement by the other end of said latch member.

16. The invention defined in claim 14, wherein the distance between the plunger connection and said one lever connection to said latch member is shorter than the distance between said one lever connection and the spring connection thereto to amplify the spring force applied to said plunger.

17. The invention defined in claim 7, wherein said cam surfaces on opposite sides of said inertia member comprises:
(a) conical depressions on opposite sides of said inertia member on a common axis,
(b) and the sides of said depressions being at a forty-five degree angle to said common axis.

18. The invention defined in claim 17, wherein said cam members comprise:
(a) rods adjustably threaded through holes in the respective levers so that the inner ends thereof extend beyond the inner edges of said levers and toward one another on a common axis, (b) locking means on said rods adjacent the outer edges of said levers for preventing said rods from turning relative to the respective levers, (c) and frusto-conical inner end portions on said rods having surfaces at a forty-five degree angle to said common axis for interfitting engagement in said conical depressions in said inertia member.

19. The invention defined in claim 18, wherein said shock responsive means further comprises:

(a) a pair of resilient compensating devices, there being one such device on each side of said inertia member for equalizing the shock force required in a direction corresponding to the axis of said rods with the shock force required in directions perpendicular thereto to trip the device, each said compensating device comprising:

(b) a bracket rigidly secured to said mounting member, (c) and resilient means mounted on said bracket and having a deflectable portion extending between a side of said inertia member and the adjacent lever, and said resilient means biasing said deflectable portion tending to oppose deflection thereof in opposite directions by said inertia member and said adjacent lever.

References Cited in the file of this patent

UNITED STATES PATENTS

| | | |
|---|---|---|
| 1,322,521 | Biffi | Nov. 25, 1919 |
| 2,426,034 | Leonard | Aug. 19, 1947 |
| 2,949,783 | Butler | Aug. 23, 1960 |